US010759441B1

(12) United States Patent
Balakrishnan et al.

(10) Patent No.: US 10,759,441 B1
(45) Date of Patent: *Sep. 1, 2020

(54) DETERMINING, SCORING, AND REPORTING MOBILE PHONE DISTRACTION OF A DRIVER

(71) Applicant: Cambridge Mobile Telematics Inc., Cambridge, MA (US)

(72) Inventors: Hari Balakrishnan, Belmont, MA (US); William Bradley, Arlington, MA (US); Samuel Ross Madden, Newton, MA (US); Jun-geun Park, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,776

(22) Filed: May 6, 2019

(51) Int. Cl.
*B60W 40/09* (2012.01)
*H04W 4/02* (2018.01)
*B60W 40/08* (2012.01)

(52) U.S. Cl.
CPC ............ *B60W 40/09* (2013.01); *H04W 4/027* (2013.01); *B60W 2040/0818* (2013.01)

(58) Field of Classification Search
None
See application file for complete search history.

(56) References Cited

U.S. PATENT DOCUMENTS

| | | | | |
|---|---|---|---|---|
| 5,148,153 A | * | 9/1992 | Haymond | G06F 3/14 340/461 |
| 8,457,880 B1 | * | 6/2013 | Malalur | G01C 21/30 701/410 |
| 9,039,648 B2 | * | 5/2015 | Kelly | A61M 1/166 604/6.08 |
| 9,228,836 B2 | * | 1/2016 | Girod | G01C 15/00 |
| 9,545,342 B2 | * | 1/2017 | Cretu-Petra | A61B 5/6808 |
| 9,645,218 B2 | * | 5/2017 | Schroers | A61M 1/3653 |
| 9,726,629 B2 | * | 8/2017 | Bhatia | G01N 27/403 |
| 10,029,696 B1 | * | 7/2018 | Ferguson | B60W 40/09 |
| 10,097,683 B2 | * | 10/2018 | Okamoto | G06F 21/74 |
| 10,111,787 B2 | * | 10/2018 | Ying | A61F 13/15707 |
| 10,130,523 B2 | * | 11/2018 | Geloen | H01M 6/34 |
| 10,155,082 B2 | * | 12/2018 | Roger | A61M 1/3413 |
| 10,296,785 B1 | * | 5/2019 | Chan | G06K 9/00845 |
| 10,349,239 B2 | * | 7/2019 | Demele | H04W 4/21 |
| 10,350,115 B2 | * | 7/2019 | Long | A61F 13/49004 |
| 10,373,257 B1 | * | 8/2019 | Iqbal | G06Q 40/08 |

(Continued)

OTHER PUBLICATIONS

NAIC "Insurance Company Telematics Rate/Rule Page: Rule UBI-1_NJ," Serff Filing Access, Apr. 19, 2018, retrieved on May 9, 2019, URL <https://filingaccess.serff.com/sfa/search/filingSummary.xhtml?filingId=131465909>, 1 pages.

(Continued)

*Primary Examiner* — Fekadeselassie Girma
(74) *Attorney, Agent, or Firm* — Fish & Richardson P.C.

(57) ABSTRACT

Among other things, information generated by sensors of a mobile phone and indicative of motion of the mobile phone and state information indicative of a state of operation of the mobile phone are monitored. Based on the monitoring, distraction by a user of the mobile phone who is a driver of a vehicle is determined.

22 Claims, 12 Drawing Sheets

(56) References Cited

U.S. PATENT DOCUMENTS

Figure 1:
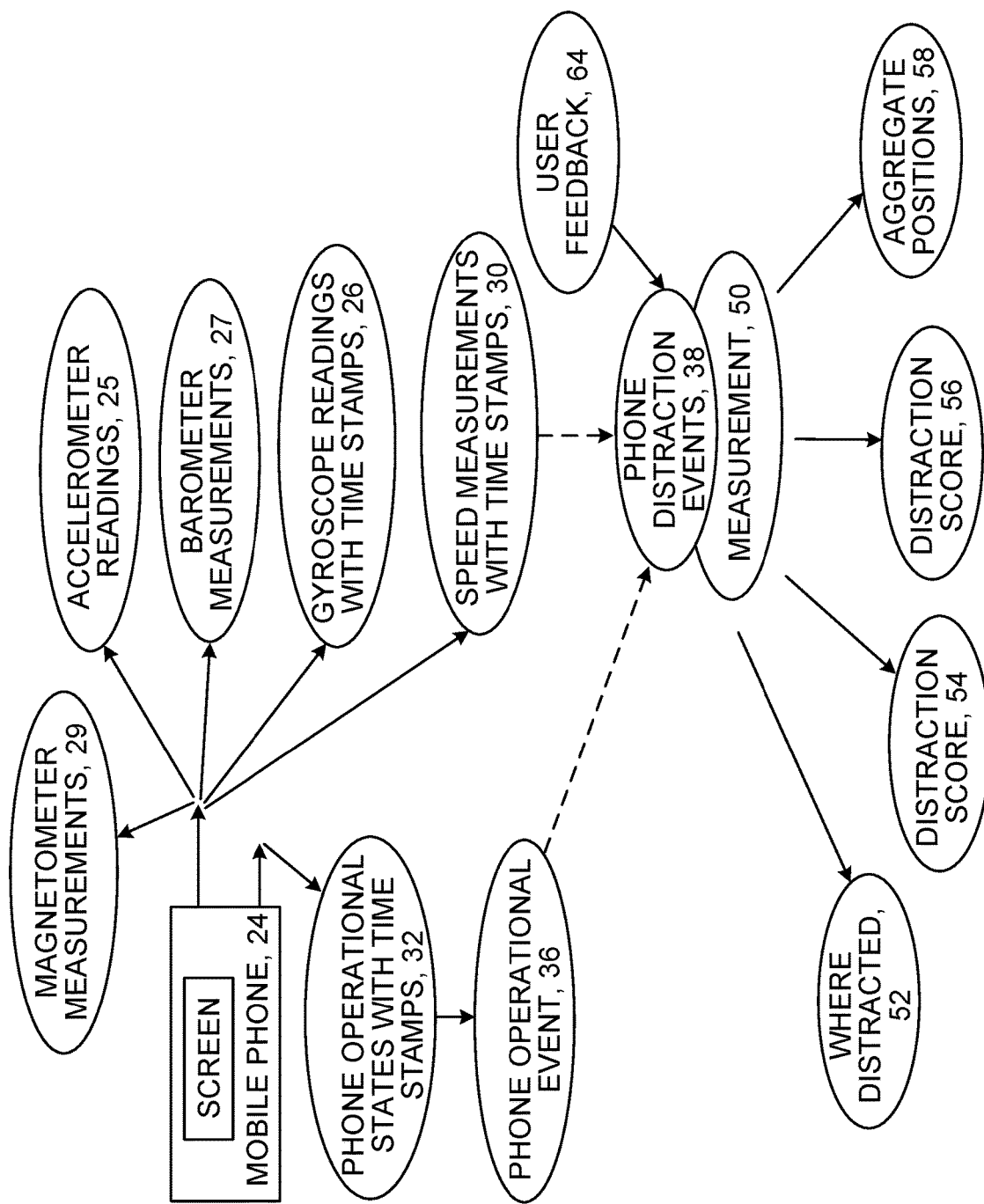

| | | | | |
|---|---|---|---|---|
| 10,388,249 B2* | 8/2019 | Beckmann | | A61B 5/18 |
| 2005/0015016 A1* | 1/2005 | Elitok | | A61B 5/0476 |
| | | | | 600/544 |
| 2009/0284476 A1* | 11/2009 | Bull | | G06F 9/452 |
| | | | | 345/173 |
| 2010/0293462 A1* | 11/2010 | Bull | | G06F 9/452 |
| | | | | 715/716 |
| 2011/0136480 A1* | 6/2011 | Osann, Jr. | | H04M 1/67 |
| | | | | 455/418 |
| 2011/0246891 A1* | 10/2011 | Schubert | | G06F 9/452 |
| | | | | 715/719 |
| 2011/0306304 A1* | 12/2011 | Forutanpour | | H04W 4/021 |
| | | | | 455/67.11 |
| 2012/0071151 A1* | 3/2012 | Abramson | | H04L 67/12 |
| | | | | 455/418 |
| 2012/0299730 A1* | 11/2012 | Rahimi | | G08B 21/0288 |
| | | | | 340/573.1 |
| 2012/0329444 A1* | 12/2012 | Osann, Jr. | | H04M 1/67 |
| | | | | 455/418 |
| 2014/0168057 A1* | 6/2014 | Ahuja | | G06F 3/017 |
| | | | | 345/156 |
| 2014/0256303 A1* | 9/2014 | Jones | | H04W 4/027 |
| | | | | 455/418 |
| 2014/0354574 A1* | 12/2014 | Hirabayashi | | G06F 3/041 |
| | | | | 345/173 |
| 2015/0312655 A1* | 10/2015 | Balakrishnan | | G07C 5/008 |
| | | | | 340/870.07 |
| 2016/0006860 A1* | 1/2016 | Neitzel | | H04W 4/021 |
| | | | | 455/419 |
| 2016/0014262 A1* | 1/2016 | Hodges | | H04W 4/029 |
| | | | | 455/419 |
| 2016/0044156 A1* | 2/2016 | Hodges | | H04M 1/72577 |
| | | | | 455/418 |
| 2016/0165031 A1* | 6/2016 | Gopinath | | H04M 1/6091 |
| | | | | 455/569.2 |
| 2016/0205238 A1* | 7/2016 | Abramson | | G01C 21/3641 |
| | | | | 455/456.4 |
| 2016/0216130 A1* | 7/2016 | Abramson | | G01C 21/3626 |
| 2016/0267335 A1* | 9/2016 | Hampiholi | | G06F 3/013 |
| 2016/0270025 A1* | 9/2016 | Osann, Jr. | | H04W 4/027 |
| 2017/0105098 A1* | 4/2017 | Cordova | | H04W 4/023 |
| 2017/0108868 A1* | 4/2017 | Johnson | | B63H 25/04 |
| 2017/0210290 A1* | 7/2017 | Cordova | | B60Q 9/00 |
| 2017/0236411 A1* | 8/2017 | Sumers | | G01C 21/165 |
| | | | | 701/117 |
| 2017/0279957 A1* | 9/2017 | Abramson et al. | | |
| | | | | H04M 1/6075 |
| 2017/0365007 A1* | 12/2017 | Huls | | G06Q 40/08 |
| 2018/0075309 A1* | 3/2018 | Sathyanarayana | | H04N 5/247 |
| 2018/0081614 A1* | 3/2018 | Tsai | | G06F 3/04883 |
| 2018/0122194 A1* | 5/2018 | Schoner | | G07G 1/0045 |
| 2018/0126901 A1* | 5/2018 | Levkova | | G06K 9/00597 |
| 2018/0144636 A1* | 5/2018 | Becker | | B60W 30/09 |
| 2018/0167502 A1* | 6/2018 | Madhani | | H04M 1/72569 |
| 2018/0173934 A1* | 6/2018 | Zink | | H04N 5/232 |
| 2018/0322413 A1* | 11/2018 | Yocam | | G07C 5/085 |
| 2019/0034873 A1* | 1/2019 | Boitel | | G06K 9/00825 |
| 2019/0051305 A1* | 2/2019 | Liddell | | G10L 15/26 |
| 2019/0096215 A1* | 3/2019 | Shahid | | G06K 9/6201 |
| 2019/0102840 A1* | 4/2019 | Perl | | G06N 3/08 |
| 2019/0111844 A1* | 4/2019 | Suzuki | | G02B 27/0179 |
| 2019/0159166 A1* | 5/2019 | Aggarwal | | H04W 4/12 |
| 2019/0168771 A1* | 6/2019 | Migneco | | B60W 30/09 |
| 2019/0185009 A1* | 6/2019 | Werner | | G06N 20/20 |
| 2019/0185018 A1* | 6/2019 | Tao | | B60W 50/0098 |
| 2019/0215399 A1* | 7/2019 | Simon | | G05D 1/00 |
| 2019/0225080 A1* | 7/2019 | Mueller | | H04M 1/7253 |
| 2019/0236387 A1* | 8/2019 | Firik | | H04M 1/72577 |
| 2019/0245965 A1* | 8/2019 | Anter | | H04W 4/50 |
| 2019/0265868 A1* | 8/2019 | Penilla | | G07C 5/085 |
| 2019/0270459 A1* | 9/2019 | Williams | | H04M 1/72569 |
| 2019/0276048 A1* | 9/2019 | Suzuki | | B60W 60/0057 |
| 2020/0005778 A1* | 1/2020 | Kim | | G10L 15/22 |

OTHER PUBLICATIONS

USPTO Transaction History and Application as filed in U.S. Appl. No. 16/403,761, retrieved on May 9, 2019, 69 pages.

* cited by examiner

DETERMINING, SCORING, AND REPORTING MOBILE PHONE DISTRACTION OF A DRIVER

BACKGROUND

This description relates to determining and reporting mobile phone distraction of a driver.

Determining and reporting mobile phone distraction of a driver is useful because, among other reasons, driver mobile phone distraction poses a significant crash and accident risk.

In an existing system developed by Cambridge Mobile Telematics serving various safe-driving mobile applications, sensor data from personal mobile devices (e.g., smartphones), in some cases augmented with sensor data from an optional device attached to a vehicle, has been used to measure the quality of driving of drivers with the goal of improving their driving to make roads safer. The sensors available on a mobile phone that are useful in achieving this goal include, but are not limited to, position sensors (e.g., the Global Positioning System, GPS), a three-axis accelerometer to measure the phone's acceleration along three orthogonal axes, and a three-axis gyroscope to measure the phone's angular velocity along the three axes.

We use the term "mobile device" to include, for example, any kind of equipment that can be carried by a user without requiring wired connection to a communication link and is subject to being used, while a user is driving, in a way that can cause distraction of the user from the driving. Mobile devices include mobile phones, for example.

In the existing system, users install a mobile application (app) on the mobile phone and drive with it. The app runs in the background, automatically detecting the start and stop of each trip using information from location and mobile phone activity APIs provided by the iOS and Android operating systems, in some cases augmented with information from the inertial sensors on the phone; or, using wireless signals from an in-vehicle device such as the tag device from Cambridge Mobile Telematics (described in patent application publication US20150312655A1 and incorporated here by reference). The mobile app then gathers sensor data from the movement sensors, including position sensors, accelerometer, and gyroscope when the user (of the phone) is driving. This sensor data is analyzed and initially processed on the mobile phone, then sent to servers in the "cloud" via a wireless network (e.g., Wi-Fi, cellular, or any other network providing connectivity to the servers). At the cloud servers, a telematics engine processes the stream of sensor data from the mobile device to accurately estimate both the dynamics of the vehicle and the movement patterns of the mobile phone within the vehicle. These computations could be run on the mobile device itself without the data being sent to cloud servers.

The estimated vehicle dynamics include map-matched positions (latitude/longitude/altitude), aspects of which are disclosed in U.S. Pat. No. 8,457,880, incorporated here by reference. The estimated vehicle dynamics also include the "longitudinal" (in the direction of the vehicle, i.e., the forward acceleration and braking) and "lateral" acceleration (e.g., cornering) of the vehicle, aspects of which are described in U.S. Pat. No. 9,228,836, incorporated here by reference. For braking, acceleration, and cornering, the system uses the accelerometer and gyroscope data from the phone—which measures the force the phone is experiencing along three orthogonal axes, typically two axes parallel to the surface (e.g., the surface of the display screen) of the phone and one axis perpendicular to the surface of the mobile phone—and transforms these signals into an estimate of the acceleration of the vehicle, while ensuring that the movement of the phone relative to the vehicle itself does not contribute. This process includes estimating and segmenting periods of time when the phone is moving in a reference frame independent of the vehicle, e.g., because the orientation of the phone was changed by the user. As discussed later, the process by which this segmentation of a trip into distinct periods when the phone was being significantly moved within the vehicle is important for the assessment of phone distraction.

The servers in the cloud also compute scores for aspects of the user's driving, taking into account factors such as patterns of hard braking, at-risk speeding, harsh acceleration, harsh cornering, amount of driving, time of driving, and the user's phone distraction. In a version called the DriveWell™ program, the servers also provide an overall score (typically over a rolling time window, such as over one day, two weeks, one month, three months, one year, etc.) and features to engage users and incentivize safer driving, such as personalized driving tips, a leaderboard where users can compare their scores (to their families, friends, neighbors, co-workers, town, state, etc.), and cash prizes for safe driving. A key aspect of the scoring is an assessment of phone distraction.

The server also applies several classifiers to the sensor data captured from the mobile device. One such classifier produces a probability or likelihood estimate as to whether the sensor data represents data from a car or some other vehicle, such as bus, train, bike, etc. Another classifier estimates, for car trips, whether the user of the device was a passenger or driver, based on both the sensor data as well as other contextual information, such as the start and end locations of the trip.

A "phone movement" or "phone distraction" classifier determines the locations and times during which a user was using her phone during a trip. Typically, the location information about distraction events are provided as a time-stamped sequence of road segments, or more generally, as <start, end> latitude/longitude position tuples together with polylines connecting the start and end positions by way of zero or more intermediate positions (also called "waypoints"). In various versions of the system this feature has been termed "phone movement", "phone motion", "phone use", "phone distraction", or "distraction".

The existing method builds on the approach disclosed in U.S. Pat. No. 9,228,836, incorporated here by reference, in which the sensor data obtained from the trip is segmented to demarcate periods during which the phone was deemed to have moved relative to the frame of reference of the vehicle (e.g., it was moved either by a user or for other reasons within a vehicle). This procedure involves the use of accelerometer and/or gyroscope data; when the dynamics of these sensors is above various thresholds, the phone is considered to have "moved".

The movement of a phone does not by itself constitute "distraction"; it is, however, a factor indicative of distraction—a necessary but not sufficient condition. To classify whether a particular set of segments of a trip with phone movement indicates distraction, the existing method augments the inference of phone movement with two further factors: (i) was the user likely to be interacting with the device when the phone movement occurred, and (ii) was the vehicle moving at the time of the phone movement. A specific indicator of whether the user was interacting with the phone uses the phone's screen state ("on" signifies interaction) and/or the phone's phone-lock state. With respect to vehicle movement, the existing method considers a threshold vehicle speed below which the distraction is not considered to be occurring (e.g., a user may have pulled over and be looking at their phone or driving slowly).

Thus, three conditions must all hold true for a distraction to be considered risky (and therefore a distraction episode) in the existing method:
A. Phone movement as inferred from gyroscope and/or accelerometer data.
B. User interacting with phone, inferred particularly from phone-screen state and phone-lock state.
C. The vehicle speed during the segment exceeding a threshold; various statistics of the speed over the duration of the distraction can be used, including the mean, median, or maximum.

Figure 13:
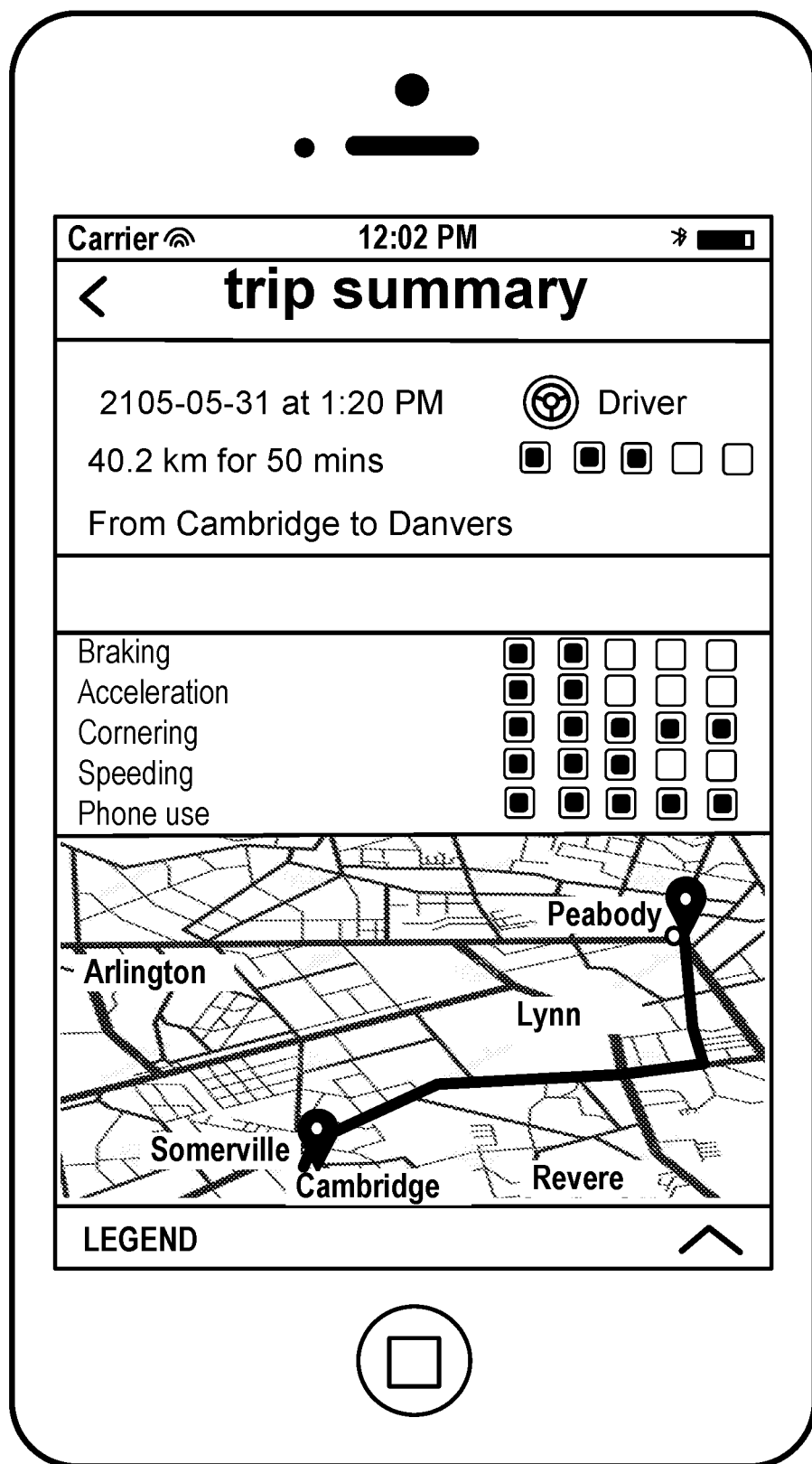

The user is able to view on their mobile app's trip interface a scored phone distraction episode. as an overlay on a map with the road segments shown in a different color or shade from the rest of the trajectory, and including some additional information (e.g., duration of distraction, speed of vehicle). In addition, by aggregating all distraction episodes for a trip, each trip is given a phone distraction score (typically on a scale of 1 to 5 or 1 to 10). An aggregate distraction score is also computed over a rolling period of time (e.g., past two weeks of driving, or any time period). FIG. 13 illustrates this interface in the existing system.

The existing method therefore includes a concept of episodes and severity metrics, logging of periods of phone motion, in particular: duration of phone motion, speed of vehicle, and road type where the distraction occurred. The existing method relies on acceleration, gyro readings, and screen state of the mobile device, as well as acceleration from an external device to detect phone motion. Sensor readings indicating movement of the mobile device must collectively last at least a minimum duration to log a phone motion episode; and movements detected within a set time interval of each other are incorporated into the same episode. These episodes are assessed individually to assign a risk to the event, which is reported to users. The episodes are also assessed collectively in generating a distraction score to display to a user: the distraction scores are assessed per driving trip and per calendar period.

SUMMARY

Here we describe improvements to the existing method developed by Cambridge Mobile Telematics. These enhancements include the following, among others: 1. The construction and use of "distraction episodes" to assess, score, and inform users of phone distraction occurring on a trip. 2. The use of additional factors, termed "distraction context", to identify user interaction with the phone in addition to screen state and phone-lock state, such as the tapping of a phone screen by the user, and processes to measure these additional factors. 3. The use of user feedback to obtain information about whether a particular distraction episode was relevant or not, for example, whether the user was a passenger, or when the user was a driver and his phone was used by a passenger in the vehicle (e.g., by a child). 4. The use of distraction context to score each phone distraction episode and to score each trip.

We use the term "trip" broadly to include, for example, any continuous period of driving within a car or other conveyance. A trip can begin at a certain starting location and time and end at a certain ending location and time.

We use the term "distraction episode" to include, for example, any occurrence, during a segment of a trajectory of a trip or during a time period of a trip, of a perceptual or other disruption, confusion, diversion, or interruption of the activities of a driver in driving a conveyance.

We use the term "distraction context" broadly to include, for example, one or more circumstances or conditions associated with a distraction episode.

We use the term "conveyance" broadly to include, for example, any vehicle or other transportation device that can be driven on roads during a trip. Conveyances can include cars, trucks, carts, motorcycles, and bicycles to name a few.

In general, in an aspect, signals are received from one or more detectors housed in a mobile device while the mobile device is on a trip. The received signals from the detectors are used to identify one or more physical states of the mobile device during the trip. Based on the identified physical states, discrete events separated in time are generated. A distraction episode is determined that spans two or more of the events during the trip.

Implementations may include one or a combination of two or more of the following features. The detectors include an accelerometer. The detectors include a gyroscope. The physical state includes motion of the mobile device relative to a conveyance used in the trip. The physical state includes an operational state of the mobile device. The operational state includes a state of a display screen of the mobile device. The physical state includes speed of motion of the mobile device along a trajectory of the trip. The operational state includes a state of locking of the mobile device. The operational state includes a state of a phone call. The operational state includes a power condition. The operational state includes an aspect of a foreground app running on the mobile device. At least one of the discrete events includes a possible discrete distraction event during the trip. At least one of the discrete events includes the mobile device being picked up. At least one of the discrete events includes tapping on the mobile device. At least one of the discrete events includes the mobile device being held or facing in the direction of a driver. At least one of the discrete events includes the mobile device being rotated.

Determining a distraction episode includes determining a start of the distraction episode. Determining a start of the distraction episode includes determining when a first physical state has begun, provided that a second physical state occurs simultaneously with the first physical state within a threshold period after the first physical state began. Determining a distraction episode includes determining an end of the distraction episode. Determining an end of the distraction episode includes determining that a physical state of the mobile device includes no interaction by a user. Determining an end of the distraction episode includes determining that a physical state of the mobile device includes no further motion of the mobile device. Determining that a physical state of the mobile device includes no further motion of the mobile device includes determining that accelerometer or gyroscope values are lower than a threshold. The threshold differs from a threshold used in determining motion of the mobile device at the start of the distraction episode. The end of the distraction episode is not determined until after a refractory period of no further movement of the mobile device is no indication of a continued distraction. Determining an end of the distraction episode includes determining that a context of the mobile device indicates no further distraction. Determining a distraction episode includes determining a possible distraction episode in determining that the possible distraction episode includes a true distraction episode. Determining that the possible distraction episode includes a true distraction episode includes determining that a time period spanned by the possible distraction episode is longer than a predetermined length.

The determined distraction episode is assessed. A score is assigned to the determined distraction episode. Information about a distraction episode is reported to a user of the mobile device or to another party.

In general, in an aspect, signals are received from one or more detectors housed in a mobile device while the mobile device is on a trip. The received signals from the detectors are used to identify one or more physical states of the mobile device during the trip. A possible distraction episode is determined based on one or more of the physical states. A context of the possible distraction episode is determined.

Implementations may include one or a combination of two or more of the following features. Determining the context of the possible distraction episode includes: receiving signals from an operating system of the mobile device or an app running on the mobile device. Based on the received signals, a determination is made that the mobile device is engaged in an active telephone call. Based on the received signals, a determination is made whether the mobile device is engaged in an active telephone call using a handset speaker, an internal speaker phone, or an external speaker. Based on the received signals, a proximity of a user's hand to the mobile device is determined. Based on the received signals, a determination is made whether a display screen of the mobile device is being tapped. Based on the received signals, a foreground app running on the mobile device is identified. Based on the received signals, a behavior of a conveyance being used for the trip is determined.

Determining the context of a possible distraction episode includes: detecting a rotation of a display screen of the mobile device. A tap on the display screen is determined based on a parameter of the rotation. Based on the received signals, a frequency of taps on a display screen of the mobile device is determined. Based on the received signals, temporal parameters of a sequence of taps on a display screen of the mobile device are compared with temporal parameters of known sequences of taps on display screens of mobile devices. An occurrence of a tapping event is determined based on a tapping score based on taps in the sequence and periods of time between successive taps.

Based on the received signals, an orientation of the mobile device or a display screen of the mobile device during the possible distraction episode is determined. Based on the orientation of the mobile device or the display screen of the mobile device, the context of the possible distraction episode is identified. When the display screen of the mobile device faces the back of a conveyance used for the trip, the mobile device is oriented generally vertically, and the mobile device has not been substantially rotated during at least a threshold period, the context of the possible distraction episode includes the mobile device being mounted in the conveyance. When the display screen of the mobile device faces the back of a conveyance used for the trip and the mobile device is oriented in a direction for normal use by an occupant of a conveyance, the context of the possible distraction episode is not that the mobile devices mounted. When the display screen of the mobile device faces generally to a side of a conveyance used for the trip, and the top end of the display screen is oriented generally upwardly, the context of the possible distraction episode includes the mobile device being held in the vicinity of an ear of an occupant of the conveyance. When the display screen of the mobile device faces generally downwardly, the context of the possible distraction episode includes the mobile device not being used. The distraction context and the possible distraction episode are reported to a user of the mobile device. The possible distraction episode is scored using the distraction context. The user is shown how the user was distracted when the phone distraction episode occurred. The context provides an input for scoring distraction episodes.

In general, in an aspect, signals are received from one or more detectors housed in a mobile device while the mobile device is on a trip. A possible distraction episode is determined based on the received signals. Information is received from a user who was a participant on the trip indicative of a circumstance of the trip. A determination is made that the possible distraction episode was a relevant distraction episode based on the circumstances of the trip.

Implementations may include one or a combination of two or more of the following features. The circumstance of the trip includes the user of the mobile device during the possible distraction episode not being a driver of the trip. Information about the possible distraction episode is presented to a user. The information indicative of the circumstance of the trip is received from the user in response to the presenting of the information about the possible distraction episode.

The user not being a driver of the trip is determined automatically. The user not being a driver of the trip is determined automatically based on previous trips labeled by users. The determining of a possible distraction episode includes varying the rate at which possible distraction episodes are determined based on a parameter, and adjusting the parameter based on information received from users about whether possible distraction episodes were relevant distraction episodes. Two or more such possible distraction episodes are determined based on the received signals, and the possible distraction episodes for a given user are aggregated based on at least one of the following factors: types of possible distraction episodes, speeds associated with possible distraction episodes, types of roads, frequencies of routes traveled, or length of possible distraction episodes. The information about the aggregated possible distraction episodes is reported to the user.

In general, in an aspect, signals are received from one or more detectors housed in a mobile device while the mobile devices on a trip. The received signals are indicative of a possible distraction episode and of the context of the possible phone distraction episode. A relevant distraction episode is determined from the possible distraction episode, and the relevant distraction episode is scored.

Implementations may include one or a combination of two or more of the following features. The scoring includes accounting for the context including at least one of: speed, time of day, day of week, season, road type, weather conditions, or direction of motion. The scoring includes accounting for the context including at least one of movement or orientation of the mobile device or tapping on a display screen of the mobile device. The result of the scoring is reported to a user. The reporting includes showing the user a location of a relevant distraction episode along a trajectory of the trip. The reporting includes showing the user a score that resulted from the scoring. The reporting includes reporting to a third party. The location information for relevant distraction episodes for two or more trips is aggregated. The contexts of relevant distraction episodes are aggregated. The aggregated contexts are reported with respect to at least one of: speed distribution during relevant distraction episodes, orientations of mobile devices during relevant distraction episodes, and activity state distributions of mobile devices during relevant distraction episodes.

In general, in an aspect, a report is made to a user of a mobile device of an inference that the user was distracted by use of the mobile device during a distraction episode that occurred while the user was driving. Information is received from the user indicative of whether the inference is correct. If incorrect, information is received from the user indicative of why the inference is incorrect.

In general, in an aspect, an extent of distraction of a driver of a vehicle is determined by use of a mobile device for each of two or more distraction episodes that occurred during a trip. The extent of distraction of the driver during the trip is scored based on the determined extents and information from distraction context for the distraction episodes.

In general, in an aspect, operation of a mobile phone is enhanced in connection with a determination of phone distraction of a user of the mobile phone while driving. For a period during a trip that has a start and an end, the mobile phone generates a set of measurements representing angular velocity or acceleration or both of the mobile phone and generates timestamps for each of the measurements, for a period during the trip. The mobile phone generates a set of phone operational states or changes in phone operational states or both and generates timestamps for each of the phone operational states or changes in the phone operational states. During or after the trip, at least one of the sets of measurements, at least one of the sets of phone operational states, and the corresponding time stamps is provided for analysis at the mobile phone or at a server or a combination of them, to determine at least one phone distraction episode during the trip.

Implementations may include one or a combination of two or more of the following features. The phone operational states include at least one of a screen of the mobile phone being on, the mobile phone being unlocked, a phone call, or another state indicating a possible interaction of the user with the mobile phone. The period includes the entire trip. The period includes a moving time window with respect to the trip.

In general, in an aspect, there is monitoring of information generated by sensors of a mobile phone and indicative of motion of the mobile phone and state information indicative of a state of operation of the mobile phone. Based on the monitoring, distraction by a user of the mobile phone who is a driver of a vehicle is determined.

Implementations may include one or a combination of two or more of the following features. The monitoring of includes monitoring acceleration or angular velocity or both of the mobile phone. The monitoring of information includes detecting movement of the mobile phone. The monitoring of information includes determining a phone operational state or changes of a phone operational state or both. The determining of distraction includes generating a phone distraction episode. The determining of distraction includes determining that motion of the mobile phone lasted longer than a threshold.

In general, in an aspect, determining that distraction includes determining that the magnitude of the motion of the mobile phone exceeds a threshold. Determining the distraction includes determining that motion of the phone has ended. Determining that motion of the phone has ended includes at least one of determining that the change in orientation of the mobile phone relative to gravity has fallen below a threshold; determining that the angular rotation of the mobile phone has fallen below a threshold: determining a volatility of acceleration or angular velocity or both of the mobile phone; and determining that tapping on the screen of the phone has ended.

In general, in an aspect, there is a determination from information about motion of a mobile phone or a state of operation of a mobile phone or both, that a user of the mobile phone is distracted during driving of a vehicle, and a determination of information about at least one of an orientation of the phone, or a direction in which a display of the phone is facing or a state of the operation of the phone information about a context in which the user of the mobile phone was distracted during driving of the vehicle.

Implementations may include one or a combination of two or more of the following features. The context includes at least one of: the mobile phone was mounted on the car; the user was holding the mobile phone and the display was facing the user; and the mobile phone was being held by the user near the user's ear. The state of operation of the mobile phone inherently specifies the context.

In general, in an aspect, information is presented to a user of a mobile phone through a user interface of the mobile phone information about distraction associated with use of the mobile phone while the user was driving a vehicle. The information is presented on a map showing a trajectory of a trip in which the distraction occurred. Feedback is received from the user about accuracy of the information presented on the map.

In general, in an aspect, a time sequence of information about angular velocity of the mobile device is received from the mobile device. Peaks of angular velocity along one or more axes relative to the mobile phone are determined. A determination is made that tapping is occurring on a screen of the mobile device based on the peaks.

Implementations may include one or a combination of two or more of the following features. The peaks include related peaks that occur along two orthogonal axes. The determining includes analyzing a frequency of the tapping. The determining includes comparing the detected peaks with comparison peaks known to be associated with tapping. The states of operation of the mobile phone are determined based on the states of operation.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 4:
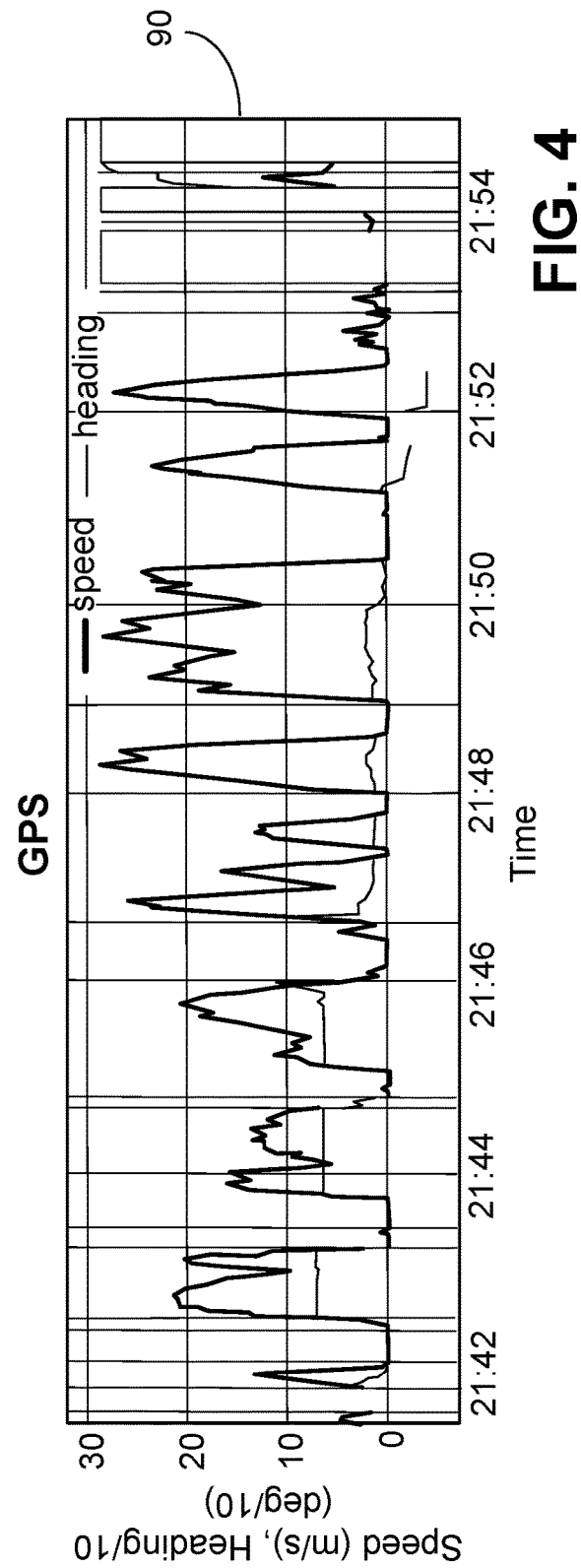
Figure 5:
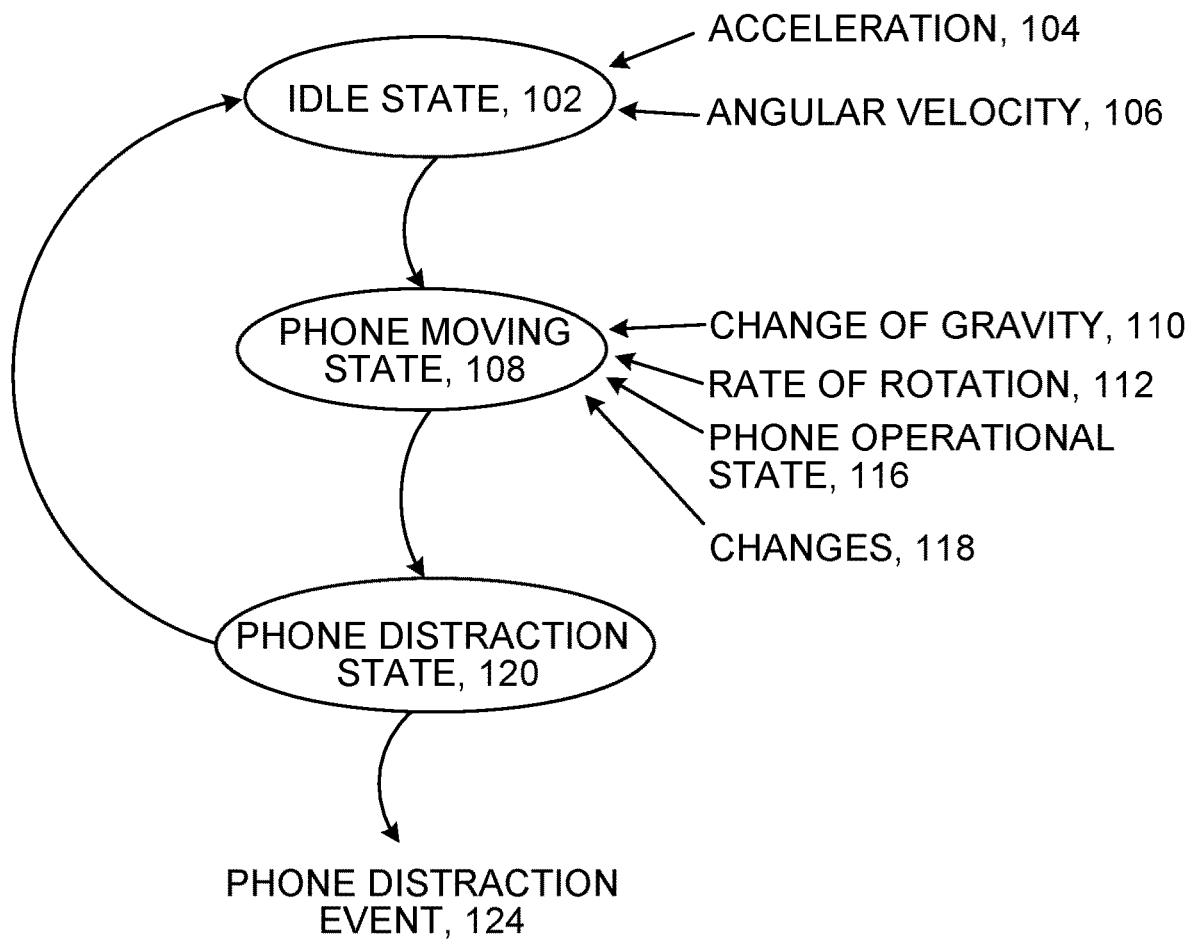
Figure 9:
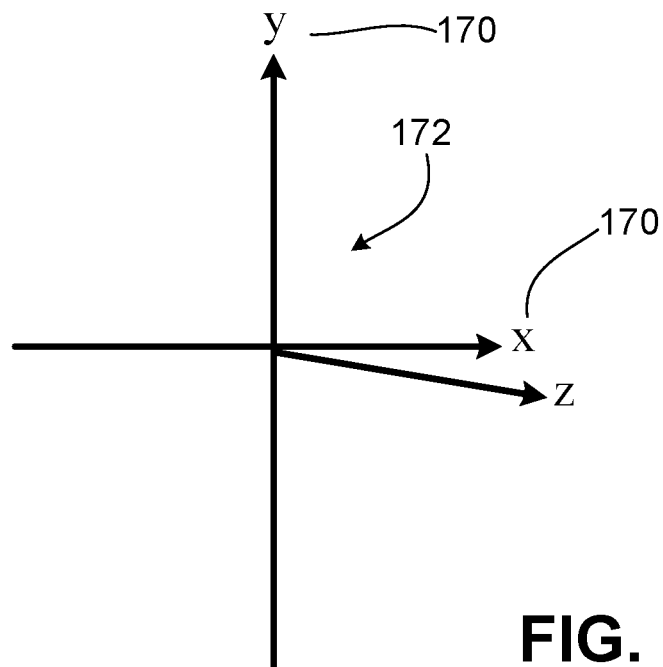
Figure 10:
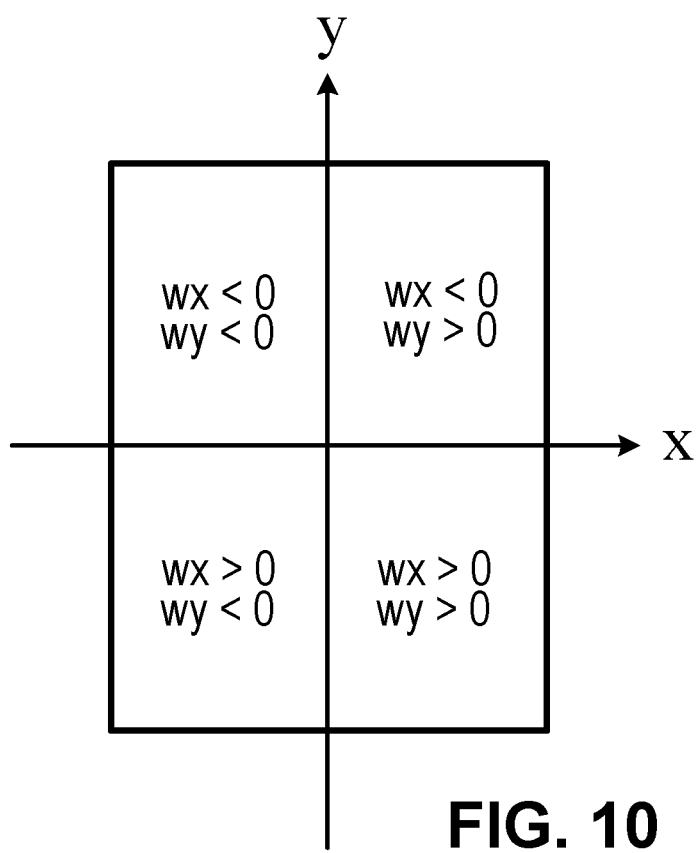
Figure 14:
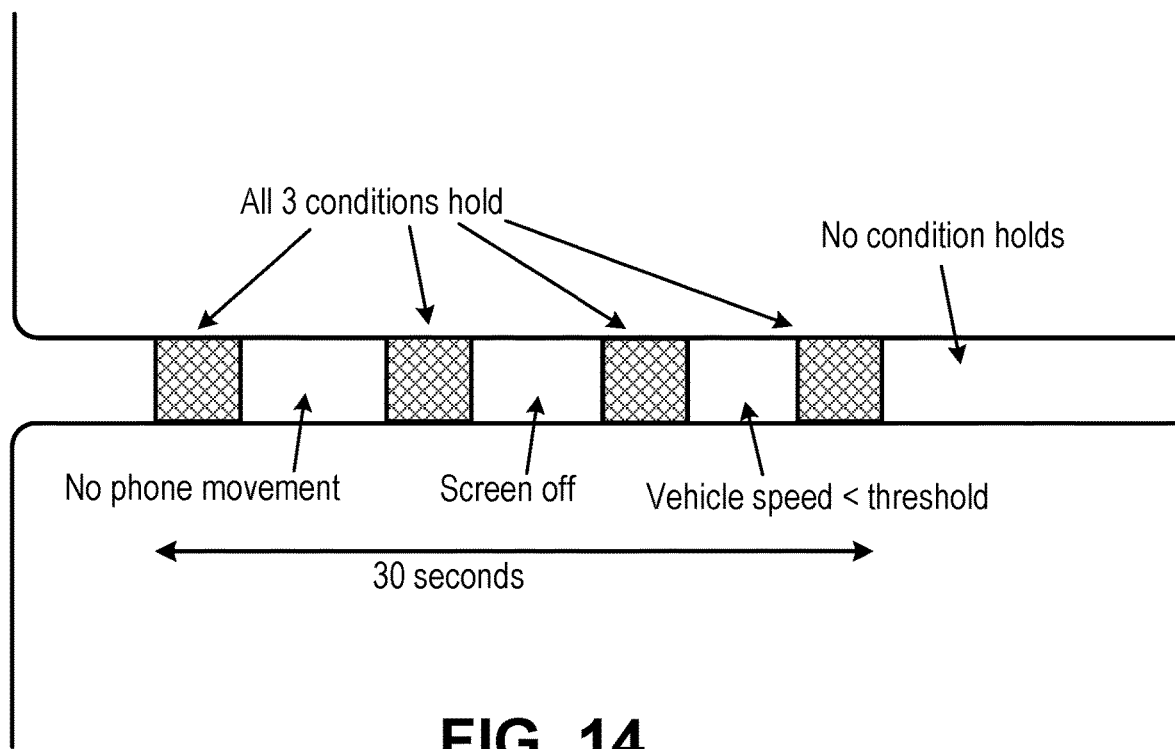

FIGS. 1 and 5 are block diagrams.
FIGS. 2, 6, 7, 8, and 13 are screenshots.
FIGS. 3, 4, 11, and 12 are timing graphs.
FIGS. 9, 10, and 14 are conceptual diagrams.
Among the features of and advantages achieved by various implementations of the technology that we describe here are the following:
1. Distraction episodes: The technology aggregates an intermittent sequence of individual distraction events that may not exist continuously—e.g., whenever the phone is determined to have moved within the vehicle, and the speed exceeds a threshold, and the screen is on and/or phone isn't locked and/or some form of user interaction is occurring—into a single discrete "distraction episode".
2. Distraction context: The technology takes advantage of new ways to assess whether a user is interacting with his phone, including steps to identify phone tapping. Such factors constitute a "distraction context", and are useful to assess the significance of a possible distraction episode and to score its degree of risk accurately.

3. Incorporating user feedback: At least two additional elements of interaction and feedback pertaining to distraction are useful in addition to providing a way for a user to label a trip as a "passenger" or even as a different transport mode (e.g., bus, train, etc.). In some implementations, the first is to allow a user to dispute a flagged distraction episode by interacting with a map overlay of the route where the distraction episodes are specifically highlighted and are "clickable" for feedback to inform the system that the user did not believe there was a relevant distraction episode at the claimed time and location. The second is the common situation in which the user of the phone is in fact the driver, and the dispute is not the existence of a possible distraction episode, but whether the possible distraction episode is a relevant distraction episode for the user as a driver, given the source of the distraction, such as a passenger in the car and not the driver.

4. Scoring relevant distraction episodes using distraction context: By taking the distraction context into account when scoring a distraction episode, the system is able to provide a score that better captures crash risk than prior approaches to scoring phone distraction.

Some implementations of the technology enhancements that we describe here—for mobile phones, cloud servers, and systems that analyze information from mobile phones—determine, among other things, distractions (e.g., distraction episodes) of drivers associated with uses of mobile phones and report information about the distractions to the drivers (and, in some cases, other parties). The information analyzed and reported can include, for example, when and where the distraction episodes occurred and other aspects of the contexts of the distractions, including the speed, the acceleration or braking, the cornering or swerving or turning, the time-of-day, day-of-week, or month-of-year, the amount of prior driving on the trip, the amount of prior driving during the preceding several hours or the same day, as well as the nature of the user's interaction with the phone. The distraction context is useful in assessing a score, and is intended to capture information indicative of the risk of a crash or accident.

Although the existing system scored distraction by estimating the total amount of time spent distracted while driving, the technology that we describe here provides an approach that may better capture the risk of an accident or crash.

In some implementations of the technology that we describe here, the distraction is determined using data from sensors on a mobile phone. In some cases, the technology focuses on distractions associated with holding or using the mobile phone, such as picking up a phone and talking, using an app in ways that involve moving the phone, or tapping on the screen of the phone, typically without regard to the particular identity of the app. In some instances the technology determines certain kinds of distraction that may occur when the mobile phone is mounted in a fixed position, or when the driver is using the phone hands-free, so as to not adversely count such occurrences toward (or otherwise to reduce their impact on) a distraction score attributable to the driver.

In some cases, the kinds of distractions of a driver that are targets of the technology that we describe here may be perceptual distractions that cause a driver to divert his eyes from the road or other feature in the field of view in the direction of driving, rather than distraction that may occur with, for example, hands-free calling, which may involve cognitive impact but not necessarily perceptual distraction.

In some implementations of the technology that we describe here, a basic method for detecting phone distraction (e.g., perceptual distraction) during driving proceeds as follows.

As shown in FIG. 1, from the start of a trip to the end of the trip (a complete trip) or in some cases for a portion of a complete trip, phone sensor measurements 20 and states of operation 22 of the mobile phone 24 (which we sometimes refer to as phone operational states) are gathered. The measurements and states can include, for example, one or more of the following timestamped data: 3-axis accelerometer readings (typically gathered at a rate of 10 Hz or higher) 25; 3-axis gyroscope readings (typically gathered at a rate of 10 Hz or higher) 26; speed measurements (from GPS signals, typically gathered at a rate of 1 Hz or possibly from the vehicle's OBD interface) 30; phone barometer measurements (typically gathered at a rate of 1 Hz or higher) 27; phone magnetometer measurements (typically gathered at a rate of 10 Hz or higher) 29; and phone operational states 32, e.g., <time, state> or <time, new state>. The phone operational state may indicate, for example: screen on/off, device locked/unlocked, call state (e.g., "on phone"), "user activity" as defined by app events (like "launch the app" or "force quit"), the identity and/or nature of the foreground application currently running (if any), whether the phone is plugged in or not, and other raw data useful to compute the distraction context. Typically the phone operational state is recorded as a phone operational event 36 at the start of the trip and whenever the phone operational state changes, rather than being recorded as a periodic or isochronous time series.

The process of gathering measurements and operational states can store all measurements from the beginning of the current trip to the end of the trip (which may be preferable) or can maintain a circular buffer with limited capacity to store a set of most recent measurements for a moving-window time period of a certain duration.

Figure 3:
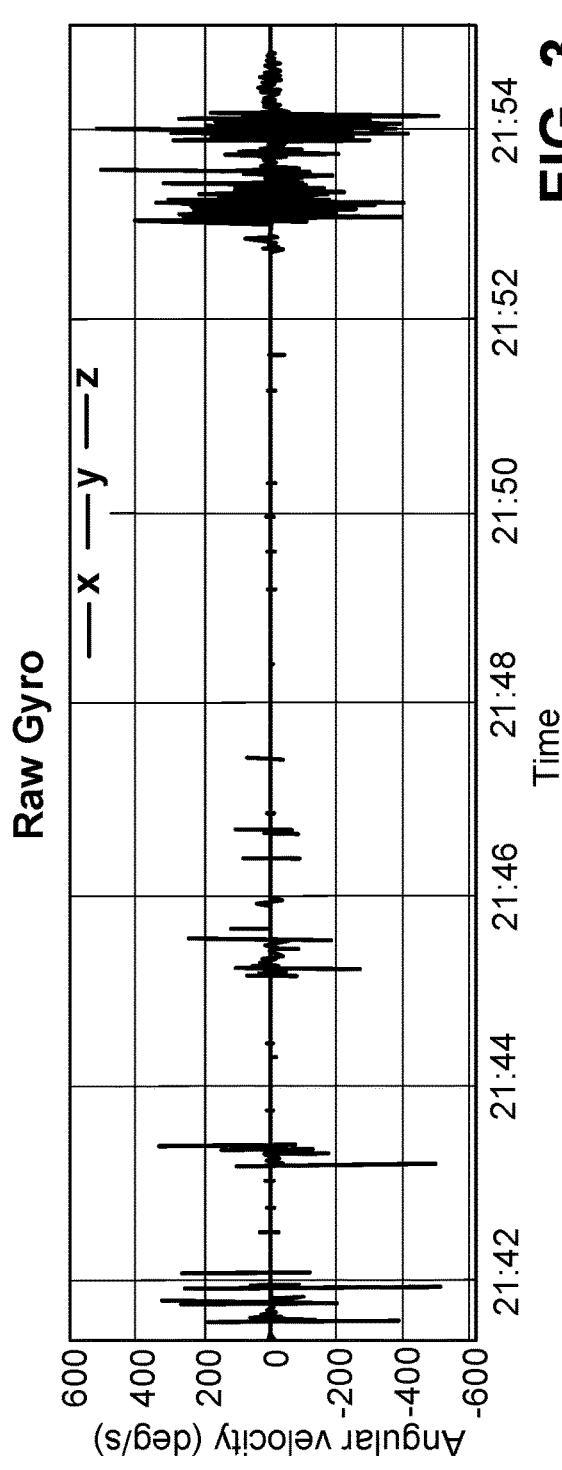

FIG. 3 shows an example of typical data from the 3 axes of the gyroscope; time periods when the phone's screen are on are apparent.

FIG. 4 shows an example of typical data for the GPS speed. The gray portions 90 indicate regions where the GPS speed was unavailable; when GPS speed is unavailable, the system errs in favor of a driver being undistracted by assuming that the vehicle may be at rest. By focusing on regions in which the speed data is available, determinations that the driver has been distracted by his phone during those periods become even more credible.

Among other things, the technology described here (i) constructs distraction episodes including a start and an end for each distraction episode, (ii) constructs the distraction context for each distraction episode, (iii) provides an interface to display the distraction episode and obtain feedback from the user on a mobile app, and (iv) scores each distraction episode and produces an aggregate distraction score for the trip.

Distraction Episodes

Distraction episodes are determined based on aggregations of one or more distraction events. A single trip can have zero or more distraction episodes. When both condition A and condition B described in the Background section hold true, the technology determines that a potential distraction event has occurred; if condition C also holds, then the potential distraction event becomes a relevant distraction event.

Because a user may move the phone only intermittently while driving, the accelerometer and gyroscope sensor data will exhibit periods of movement interspersed with periods of no movement often in rapid succession. More generally, one or two of the three conditions A, B, and C may not hold true for some amount of time, as shown for example in FIG. 14 where within a 30-second interval the three conditions all hold true only during intermittent periods even though the driver's use of the phone was essentially continuous through the entire 30-second period. Each of the intermittent periods when all three conditions hold true can be considered distraction events. Yet the technology avoids treating each of them as a separate distraction episode, a treatment that would be inconsistent with the fact that the driver was effectively engaged in a distraction episode for the entire 30-second period including the intervening periods when fewer than all of the conditions held true.

The technology that we describe here provides a way to define the start and end of a distraction episode to account for such situations.

The technology is arranged to treat a distraction episode as the finest granularity situation for which scoring is done and for which information may be presented to users both for feedback and for informational purposes. Therefore, in the situation described with respect to FIG. 14, the technology does not score each of the distraction events, but instead only scores the distraction episode. For this purpose, the technology applies certain principles, discussed below, to analyze the sensor signals and the timing of the occurrence of various conditions in deciding that a situation should be considered a distraction episode and also in determining when such an episode started and ended.

Sometimes, the start of a distraction episode occurs before conditions A and B simultaneously hold true. For example, a user may pick up his phone from a cup-holder or pocket and a few seconds later turn it on. In that case, the start of the distraction episode will be considered to have occurred when one of the two conditions A and B first holds true, provided that both conditions simultaneously hold true at some time within a threshold period of time after the one of the two conditions first holds true. Conversely, if either A or B holds true, but not both, at some point in time, and the other of A and B does not also hold true within the ensuing threshold period of time, then no distraction episode is deemed to have begun. Typical values for this threshold are between 5 and 30 seconds.

Similarly, a given distraction episode may not end when either condition A or condition B no longer holds true. Instead, the end of a distraction episode can be considered to have occurred only when all of the following conditions hold true:
(i) The distraction context determination described below indicates that there is no further distraction (e.g., there is no more phone tapping by the user).
(ii) The phone-movement detection process determines that there is no further phone movement (condition A), provided that the thresholds for accelerometer and/or gyroscope values that result in a determination of phone movement at the end of a distraction episode can in general be different from the values to determine the start of a distraction episode. When used, such a threshold difference can be useful because a smaller motion such as holding the phone near the ear while engaging in a phone call may justify extending the end of the distraction episode rather than terminating it.
(iii) A refractory period has elapsed during which neither of the above conditions (i) or (ii) holds true. A typical refractory period may be on the order of 30 to 60 seconds. The refractory period can be adjustable using the feedback interface provided to users.

In some implementations, a fourth condition is also required:
(iv) Condition B no longer holds true (i.e., the user is no longer interacting with the phone).

The distraction episodes discussed to this point are considered possible distraction episodes which may require further analysis to determine if they are relevant distraction episodes that should be scored.

In some implementations, a possible distraction episode must typically last at least a certain total amount of time to be considered a relevant distraction episode; a too-brief possible distraction episode is often one not triggered by a user, and may be caused, for example, by a phone screen being on and the vehicle driving over a pothole or speed bump causing the phone movement algorithm to trigger a potential event or episode. Therefore determining phone movement is useful for this purpose and others.

To determine phone movement, the technology monitors either or both of acceleration 104 and angular velocity 106 from the phone sensor data and uses either or both of the following techniques to determine phone movement:

1. If accelerometer measurements are available, the method can measure the change of gravity 110 in the phone's frame of reference. To do this, the method maintains a sliding window of width w around time t, including samples from t−a to t+b, where a+b=w. The method computes two vectors, representing the estimated direction of gravity, from each of the subwindows [t−a, t] and [t, t+b], by summarizing acceleration values within each window. Two typical ways of summarizing acceleration values are (i) computing a mean vector and (ii) computing a (component-wise) median vector. Given two "gravity" vectors, one from the subwindow [t−a, t], g_a, and the other from the subwindow [t, t+b], g_b, the method computes an angle between the two vectors as arccos(g_a dot g_b/ |g_a||g_b|). If the angle exceeds a certain threshold (between say 10 and 30 degrees, but other values could work), the phone is considered to have changed its orientation with respect to the direction of gravity. This concept was described in general terms in U.S. Pat. No. 9,228,836.

2. If angular velocity measurements from gyroscopes are available, the magnitude of the phone's instantaneous rate of rotation 112 can be computed. In some examples, the magnitude of angular rotation rate is computed as M=sqrt(w_x^2+w_y^2+w_z^2). M is then generally smoothed (e.g., by convolving with a Hanning window or applying a low-pass filter). If the smoothed value of M exceeds a certain threshold (which may be set from experience or by learning it using a machine-learning classifier based on feedback from users about true versus not true distraction episodes), the phone is considered to be "rotating significantly". In general, this threshold may depend on the make and model of the phone as well as being user-specific. This concept also was described in general terms in U.S. Pat. No. 9,228,836.

Distraction Context

As noted earlier and detailed below, the scoring of a relevant distraction episode will take into account information about the distraction context. Although we have described rotation of the phone as one factor from which active phone use by the driver can be inferred, other factors may also be relevant to detecting active phone use including one or a combination of two or more of the following (derived from sensors on or the operating system of) the phone: a call state that represents whether the user is currently on a call (which can indicate active phone use); whether call audio is being routed to the handset speaker, the internal speakerphone, or another external speaker (which can indicate whether the active phone use suggests perceptual distraction); proximity of the user's hand to the phone based on data from a proximity sensor (such as may be present on Android phones); the identity of the foreground app (if any) currently running on the phone (although this may be more intrusive on a user's privacy than other factors); whether the phone is moving in a way that is consistent with the user tapping on the screen (e.g., typing or interacting with an application); whether the phone is moving in a way to suggest motion of the vehicle indicative of the driver possibly being distracted, e.g., drifting behavior (as evidenced from the gyroscope signal), or driving substantially below the typical speed for a road, among others.

We describe here two key examples of distraction context: (i) reliably detecting whether a user is interactively tapping on his phone screen, and (ii) combining the phone's orientation and operational states to characterize distraction.

Example Distraction Context: Phone Screen Tapping and a Tapping Detector

Typing to send text messages and typing in social media apps are common forms of phone distraction during driving. It is useful to detect this typing behavior both to provide users with more targeted feedback about their phone distraction and to assess the degree of risk (e.g., typing may be more risky than, say, briefly swiping in a navigation app to zoom into a map). Here we describe a system for detecting typing behavior using a phone's sensors, without monitoring which app is running in the foreground (information that may either be unavailable or violate the user's privacy expectations).

Typing on a mobile device typically involves tapping on a display screen of the device with the taps occurring in a pattern. Tapping can be recognized by the following process.

When a phone user holds a phone and taps the screen, the phone undergoes a small yet noticeable rotation around its x-y plane, but not much rotation around its z-axis (FIG. 9, taken from an Android developer guide, illustrates an example arrangement of the three axes 170 relative to the phone.)

The rate of rotation in the x-y plane, induced by a single tap on the screen, is small (e.g., 0.2-0.7 radians/s) and lasts only for a short period of time, typically under a few hundred milliseconds. The phone gyroscope captures the rotation as a curve, at a high sampling rate of, for example 100 Hz, or as a single peak at a lower frequency of, for example, 15 Hz. The rotation is also usually followed by a reverting rotation in the reverse direction.

As shown in FIG. 10, if the screen of the phone is partitioned into four quadrants, the quadrant on which the user taps determines the sign of the rotation signal along the x and y axes.

Figure 11:
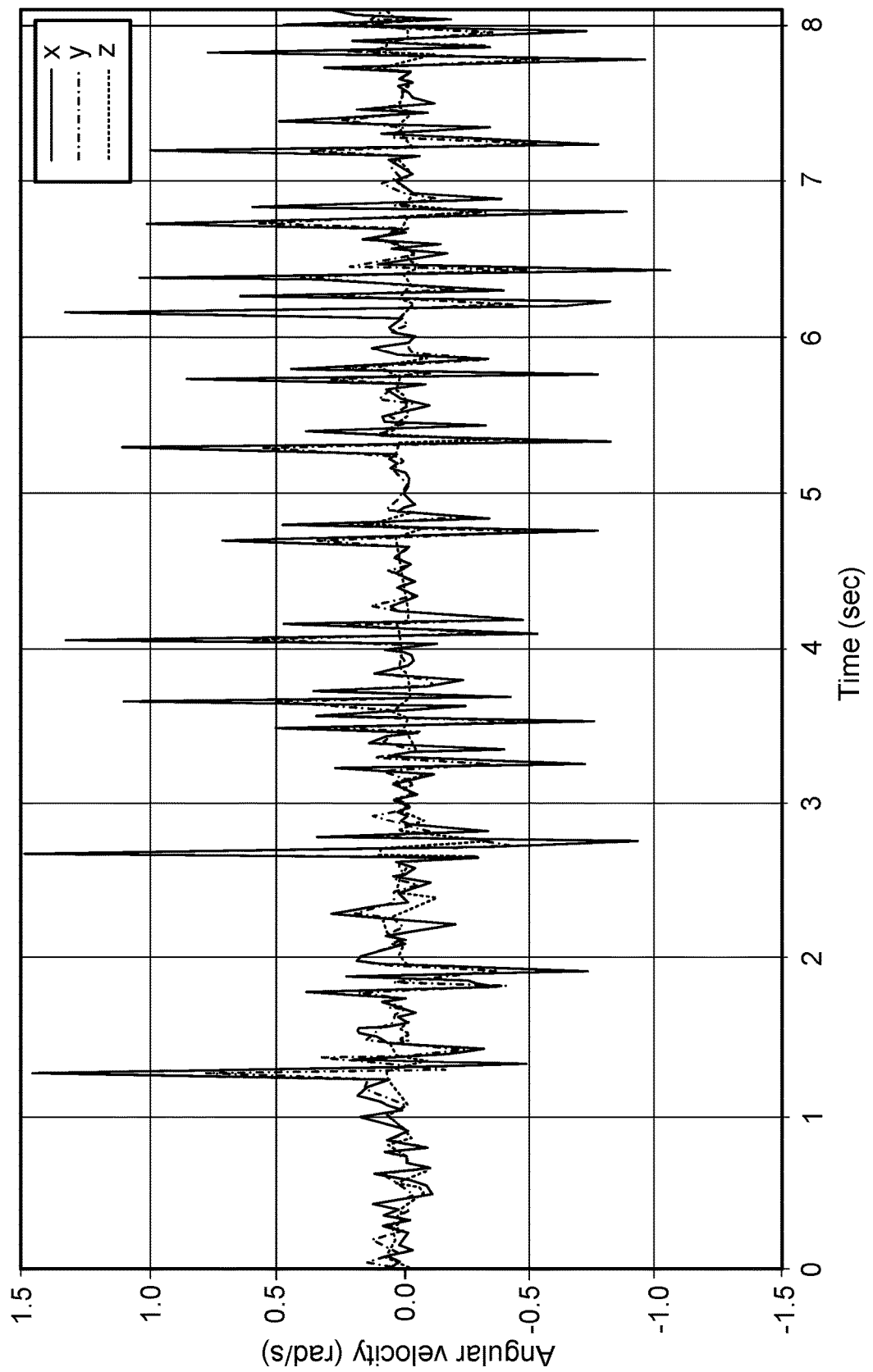

For example, if the user taps on the lower right quadrant of the screen, the phone briefly rotates along the x-axis by a positive amount and along the y-axis also by a positive amount, assuming a right-handed coordinate system. An example of the gyroscope signal captured by the phone when the user taps on the lower right quadrant several times is shown in FIG. 11.

As shown, when the user taps on the screen, a pair of synchronized peaks, one for the x-axis (solid line) and the other for y-axis (dash-dot line) appears, which is immediately followed by another peak in the reverse direction.

Figure 12:
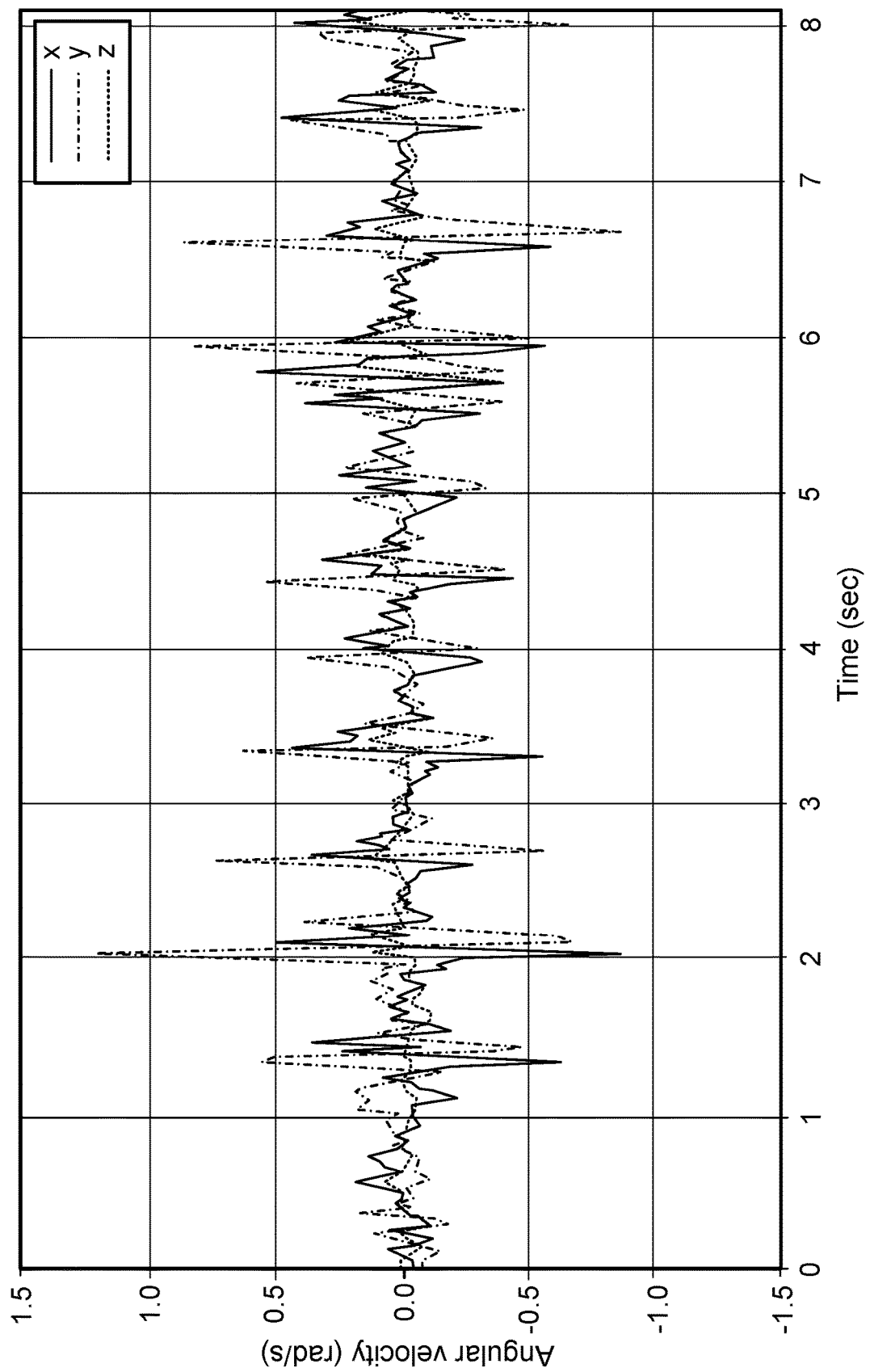

Another example of tapping is shown in FIG. 12, where the user taps on the lower left quadrant. In this case, the signs of the x-axis and y-axis peaks are opposite.

Also, when the user taps on the phone in typical phone usage, such as texting or typing in a social networking page, there is a range of plausible tapping frequencies from 5 taps a second to a few seconds per tap.

In some implementations, the tapping detector works as follows given a tri-axial angular velocity measurement stream from a gyroscope in a phone:
1. Detect each tapping event by a technique that may include either or both of the following possibilities:
   a. In the input angular velocity data stream, detect occurrences of a pair of peaks, one for the x-axis and another for the y-axis, with peak magnitudes of the rates of angular velocity within a range of magnitude thresholds (e.g., 0.2-0.7 radians/s). Then check if each detected pair of peaks is followed by another pair of peaks immediately after, e.g., within a few tens or hundreds of milliseconds, again within a range of thresholds.
      i. In a "soft" thresholding version of the algorithm (instead of hard thresholding on a fixed predefined threshold), evaluate how much the peak magnitudes for a pair of pair-of-peaks deviate from a typical peak range for tapping.
      ii. Optionally apply an additional constraint for the z-axis (the axis perpendicular to the screen), i.e., determine whether an angular velocity for the z-axis is below a certain threshold.
   b. Independently and in advance, curate a collection of actual (known) tapping events (e.g., the occurrence of a single tap) from test users and/or actual users. Given an input temporal signal representing a possible tapping event, a sliding window is applied to the signal and matched to comparable time segments of a collection of known tapping events using, for example, dynamic time warping. If there is a match with any of the known tapping events, the portion of the signal within the window is considered a tapping event. A match is defined as having a low dynamic time warping distance between the input signal and one or more of the signals in the collection; other definitions are also possible.
   c. In some implementations, the detector augments its detection of a tapping event using the phone operational state. For instance, the detector may not determine the existence of a tapping event unless the screen is in an active state (e.g., "on" or "unlocked" or both).
2. Given a sequence of tapping events detected from step 1, the detector computes a tapping score, which denotes a likelihood that the sequence of tapping events represents the occurrence of a tapping episode.
   a. The scoring starts from the zero score, S=0.
   b. For each determined tapping event, the scorer adds the sum of two terms, one from the tapping event itself (E) and the other from the inter-arrival time between the respective starts of two successive tapping events (I): S=S+(E+I).
      i. The tapping event score, E, is a positive number that encodes the closeness of the tapping event to a feature of a model tapping event. For example, the absolute deviation of the peak magnitude from the typical peak magnitude (say 0.5 radians/s) can be used, e.g., $E=\exp(-|M-0.5|)$. Or, if tapping events were detected by matching their similarities to tapping events of a training set, a function of the similarity can be used.

ii. The inter-arrival time score, I, is evaluated in a way to penalize inter-arrival times that are too short or too long, which are not indicative of typical screen tapping. For example, if the inter-arrival time is smaller than 0.1 sec or larger than 5 sec, I=−1, otherwise I=0.

c. If the score exceeds a threshold, a tapping episode is determined to have occurred.

d. If the score falls under 0, set it to zero. That is, S=max(0, S+(E+I)). This is to bound the effect of accumulated negative evidence on the existence of a tapping episode.

Example Distraction Context: Combining Phone Orientation and Operational States

The orientation of the phone, the direction in which the phone faces, and phone operational states and combinations of them enable the system to infer how the phone was being used when a phone distraction episode occurred.

Some phone operational states inherently specify a context that existed at the time of the phone distraction episode. For example, one phone operational state may be "active phone call", which indicates that the user was using his phone.

When such phone operational states are insufficient or missing and even when they are available, the phone's orientation provides additional information about the context of the distraction. A method for determining the orientation has been described in U.S. Pat. No. 9,228,836, incorporated by reference. The orientation of the phone's screen with respect to the conveyance (such as a car) in particular reveals information about the context of phone usage at the time of a phone distraction.

In some implementations, the directions in which the phone faces and the orientations of the phone display screen and combinations of them during phone distraction episodes can be organized into one or more of the following groups (states) and others as the basis for determining a phone distraction context:

1. Mounted: The screen of the phone faces generally towards the back of the car and the phone is tilted (oriented) generally vertically with respect to gravity, and the device has not experienced a rotation of more than a few degrees for several minutes or longer.

2. Holding with screen toward the driver: If the screen faces generally towards the back of the car, the phone is tilted in a direction in which people normally use the phone, and the phone is not in the Mounted state.

3. Holding at ear: The screen faces generally to a side of the car, and the top end of the screen points generally upwards (opposite of gravity direction). This may suggest that the driver is on a phone call while holding the phone near her ear.

4. Others: Other orientations may suggest that the driver is not actively engaged with the phone, for example, if the display screen is facing down.

All these are inferred from the direction of the accelerometer and optionally gyroscope vectors whose axes are in the phone's frame of reference.

Each phone distraction episode is annotated with the inferred distraction context, which comprises a vector of attributes capturing the above distraction types, along with the duration of the distraction episode and the location or time (or both) where it occurred.

The inferred distraction context can be used for at least three purposes. First, the context can be used as a variable for further analysis of phone distraction episodes, for example, to study what distraction contexts of phone distraction episodes are correlated highly with the probability of a crash or near-miss. Second, the end-user interface (eg., phone app) can present the inferred distraction context along with the phone distraction episode, showing to the user how the user was distracted when the phone distraction episode occurred. Third, the context provides an input for scoring distraction episodes.

Example Distraction Context: Weather and Ambient Conditions.

As one example, the context can be the weather, including whether it is raining or snowing, the temperature, position of the sun in the sky, etc. Certain weather conditions (e.g., snow) are known to have a much higher accident risk, and as such distraction during such periods may be more risky.

Example Distraction Context: Time.

As another example, distraction context can include time-of-day, day-of-week, and seasonal information. Certain times of day have a higher accident risk (late at night, during rush hour), so understanding this information can be important for risk scoring purposes. Additionally, information such as how much time the driver has already driven during this trip and during the previous 12 or 24 hour period can suggest driver fatigue and reduced attentiveness, which may be relevant to the distraction score.

Example Distraction Context: Vehicle Dynamics During Episode:

As a third example of context, it may include how the vehicle was moving during the distraction episode, for example, whether the vehicle was slowing or accelerating, drifting in the lane, or swerving. These behaviors can indicate the degree of distraction as well as driver inattentiveness. Finally, the relative frequency of certain driving behaviors, e.g., harsh braking, can be compared in a given user's distracted versus undistracted periods, to measure the relative risk of distraction episodes.

User Presentation and User Feedback

In addition to the features described above, the technology also can collect and leverage user feedback 64 (FIG. 1) associated with a trip or one or more distraction episodes. For example, when a user looks at a trip's trajectory and notices a region or portion of the trip having a phone distraction episode, the user may indicate that the phone was being used by a passenger, either for this portion of the trip or for the whole trip. The marker for that phone distraction episode will then be removed from the trajectory displayed to the user or the entire trip will be marked as a "passenger" trip, and the user will not be associated with (penalized by) that distraction episode.

It is also useful to be able to detect automatically if a user is the driver or passenger on a trip. Historical user-labeled trips can provide a corpus of examples of passenger trips, which can be used to evaluate and improve the performance of automated driver-versus-passenger classification. Thus, the feedback gathered as described in the previous paragraph may be used in a machine learning classifier to further improve the accuracy of passenger detection.

Additionally, the user feedback can be used to improve the automatic detection of phone distraction episodes by the technology. The parameter values used in the steps of the process of phone distraction episode detection need not be fixed values, but could vary within ranges. For example, if the settings cause over-reporting of phone distraction episodes, this may be detected by an elevated rate of user feedback indicating phone distraction episodes had not occurred, and used to recalibrate the system to more appropriate parameter values.

After detecting a phone distraction episode, the system may present information about the episode and the phone distraction context to the driver to help her to reduce phone distraction episodes. Sharing phone distraction episode information also provides an opportunity to collect feedback from the user, which can be used to validate the system and the phone distraction episodes and phone distraction contexts that it generates.

In some implementations, information about phone distraction episodes are reported that occur during a single trip. The system can display the trajectory of the single trip and annotate the portions of the trajectory during which phone distraction episodes occurred. The user can select an individual event by tapping on it or scrolling through a list of all episodes on that trip. Selecting an episode provides a pop-up with information about that episode, such as the phone distraction context, the time it occurred, duration, and other measured or inferred contextual information.

Figure 6:
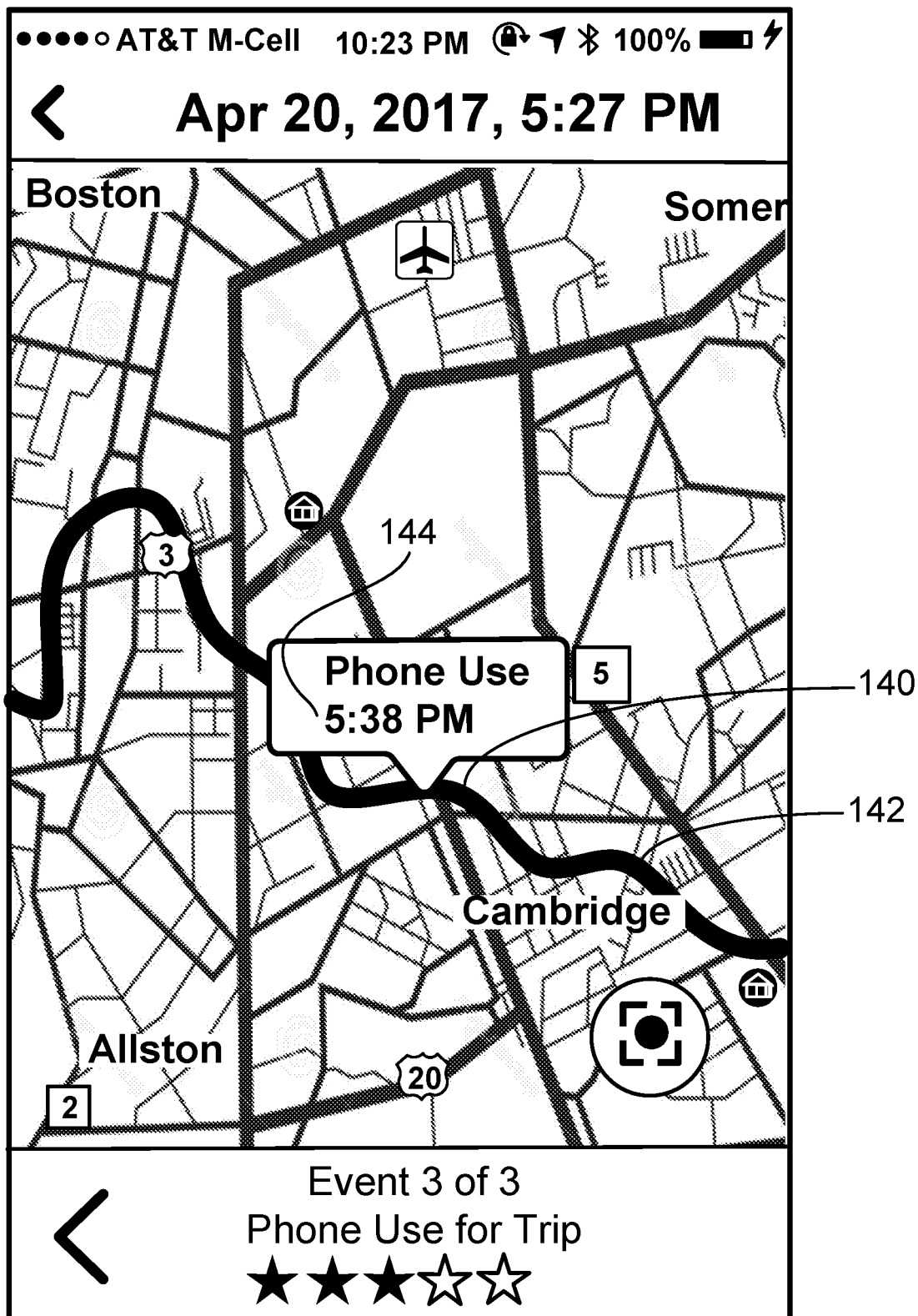

An example phone distraction episode is shown in FIG. 6 as a segment 140 on a trajectory 142 and the time 144 of the episode is shown on a pop up that was triggered by the user invoking the segment of the trajectory.

Figure 7:
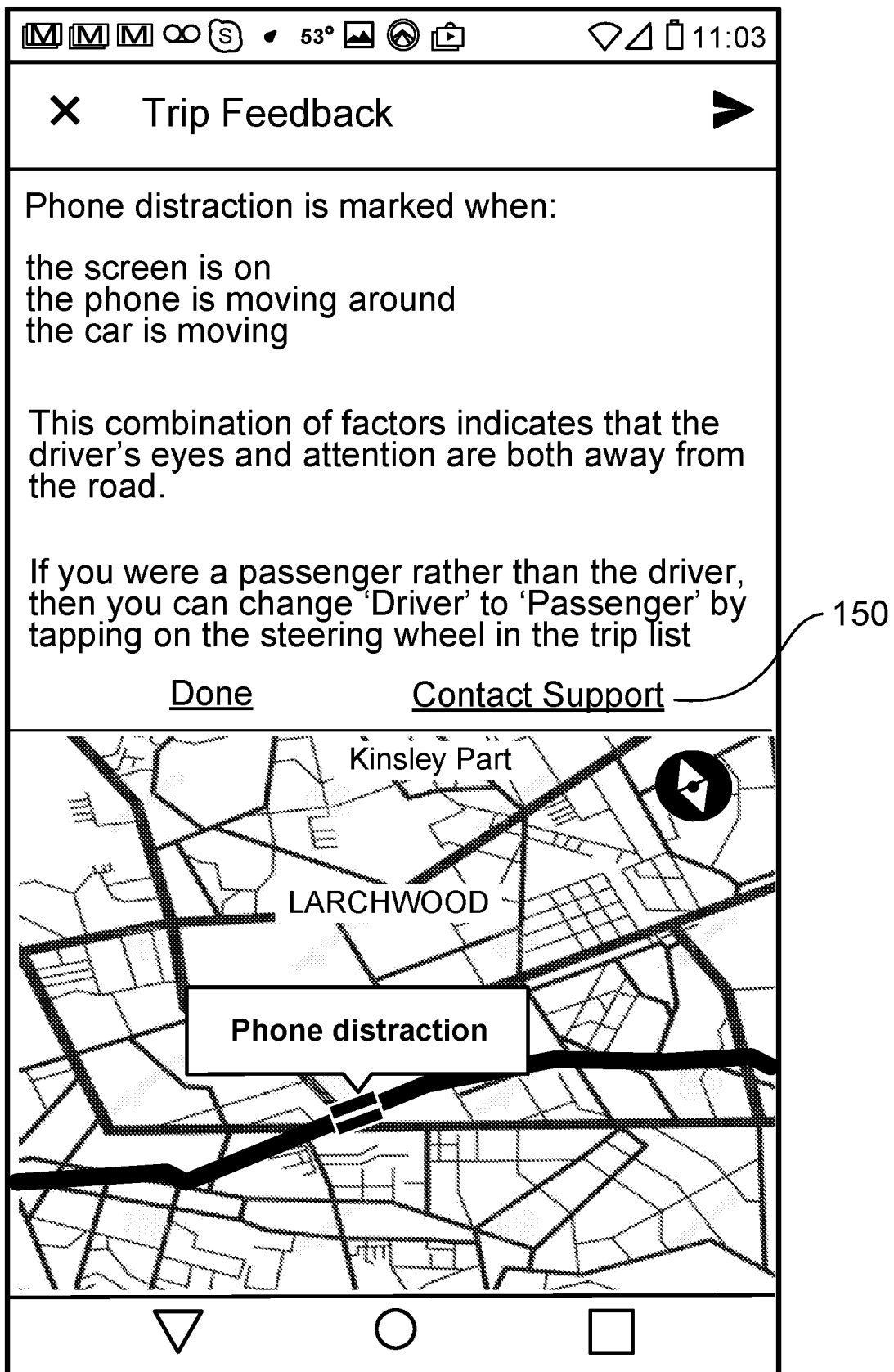

As shown in FIG. 7, the user then has the option of providing feedback, for example, to indicate that she was not the driver, but rather a passenger, on the trip. The user may also provide feedback that the trip was not taken in a car, but in a bus, train, bike or other mode of transport, or may indicate that certain portions of the labeled trip data appear incorrectly, i.e., that they were not speeding at a particular location.

Figure 8:
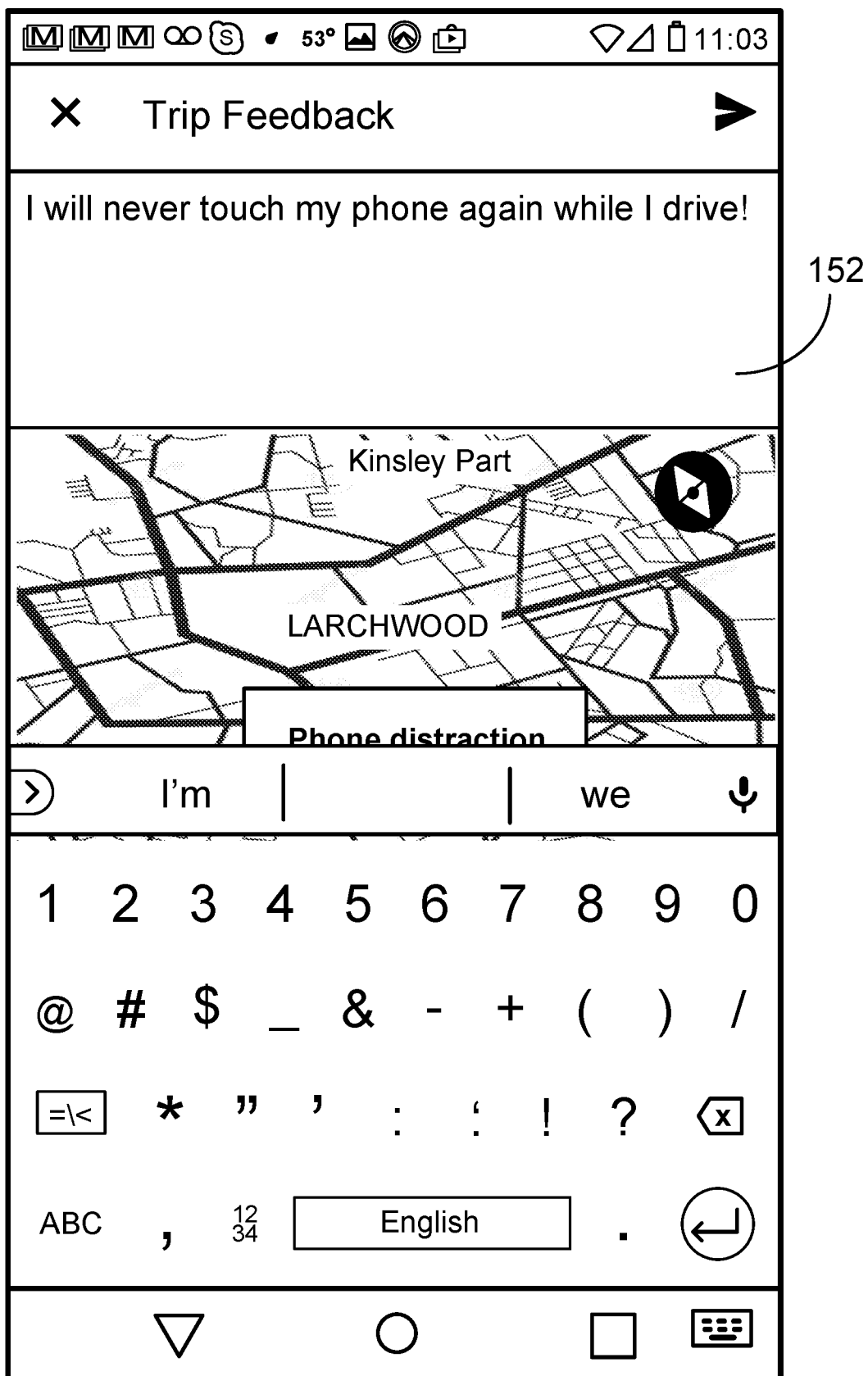

If the user selects the link 150 called 'Contact Support' (or equivalent, such as 'Provide Feedback', which could be obtained in a variety of ways), then the user is provided with a field 152 for entering (or voicing) feedback, as shown in FIG. 8.

This feedback mechanism allows the user to correct or dispute phone distraction episodes and the properties and context of each episode. It also allows the user to indicate that he was the driver (i.e., the phone belonged to the driver, not a passenger), but for one or more of the distraction episodes in question, the distraction was due to a passenger rather than the driver.

In some implementations, the system can aggregate phone distraction episodes and phone distraction contexts across multiple trips to provide a single user-level summary. For example, the system can measure how the frequency or count of phone distraction episodes varies by:
1. Estimated type of the phone distraction episode (phone call, texting, unlocking, for example).
2. Vehicle speed at the time of the phone distraction episode.
3. Type of road (highway vs. local road).
4. Frequency of route.
5. Length of the phone distraction episode.

Analyzing user-level phone distraction episode trends also enables the system to provide user-customized contextual hints for improving safety, for example, driver-specific advice like "reduce phone usage while driving home", or "do not use phone at high speeds".

Collecting user feedback allows users to feel engaged with the system and correct potential errors in information generated by the system. Feedback from users can also be useful for validating the accuracy of the algorithm.

For example, a particular set of distraction parameters generated by the system may produce a corresponding amount of feedback. The system can use the rate of feedback to estimate how frequently the system misclassifies phone distraction episodes.

By testing different parameters with users and measuring the changes in the amount of feedback, the system can estimate the corresponding misclassification performance for respective parameters. The system can then modify the parameters that are generated to reduce a false positive rate or a false negative rate for those parameters.

To test different parameters, the system can change the parameters for the whole population of users, for subsets of the population, for individual drivers, or for individual trips, or combinations of two or more of those approaches. Given a large population of drivers, this makes it possible to explore the parameter space rapidly.

Instead of or in addition to providing this information to drivers, it is possible to provide it to third parties (e.g., insurance companies).

Scoring Distraction Episodes

The scoring of phone distraction episodes is done by taking the distraction context into account. For example, distraction score can depend on speed, time-of-day, day-of-week, season, road type, weather conditions, direction of movement, etc. In addition, the type of distraction can be taken into account: phone movement and light phone tapping may be treated differently in scoring. A phone call with handset to the ear can be scored differently from a hands-free operation that may involve some tapping.

Uses

Phone distraction episode times and durations are typically determined after a trip is completed. The processes discussed above are used to measure that a phone distraction episode occurred; the severity of the episode can be a function of the amount of time distracted, the speed, the road type, or the time-of-day. The distraction episode or the measure of distraction or both can then be used in at least the following ways (and others) and combinations of them:
1. Showing the user where he was distracted 52, for example, by showing the user a map overlaid with a trajectory of her trip. Portions of the trajectory can be marked to correspond to phone distraction episodes, that is, segments in which the phone distraction episodes were detected. These portions can be indicated by a different color in the trajectory overlay. This is done in the existing method.
2. Indicating each phone distraction episode using a marker overlaid on a map. Along with the marker, the context of the phone distraction episode can be displayed, such as duration of the event, vehicle speed, road type, activity state of the phone, and the context of the trip (e.g., "on the way home"). This is done in the existing method.
3. Providing the user with a distraction score 54. The system can track the number of the user's phone distraction episodes over a short window (e.g., 2 weeks). This time period is chosen to be long enough to include some averaging between trips but short enough that a dedicated driver can see measurable improvement over the course of several days. This score is incorporated in an overall score for the driver, and this overall score can be used to encourage competition for safe driving. For example, the overall scores can be sorted and displayed on a leaderboard. This is done in the existing method.
4. Providing a third party (e.g., an insurance company or a fleet manager/operator) with a phone distraction score 56, for example, the same score that the user sees or a score based on a longer window (e.g., 6 months) that is more appropriate for actuarial purposes. This is done in the existing method.

Figure 2:
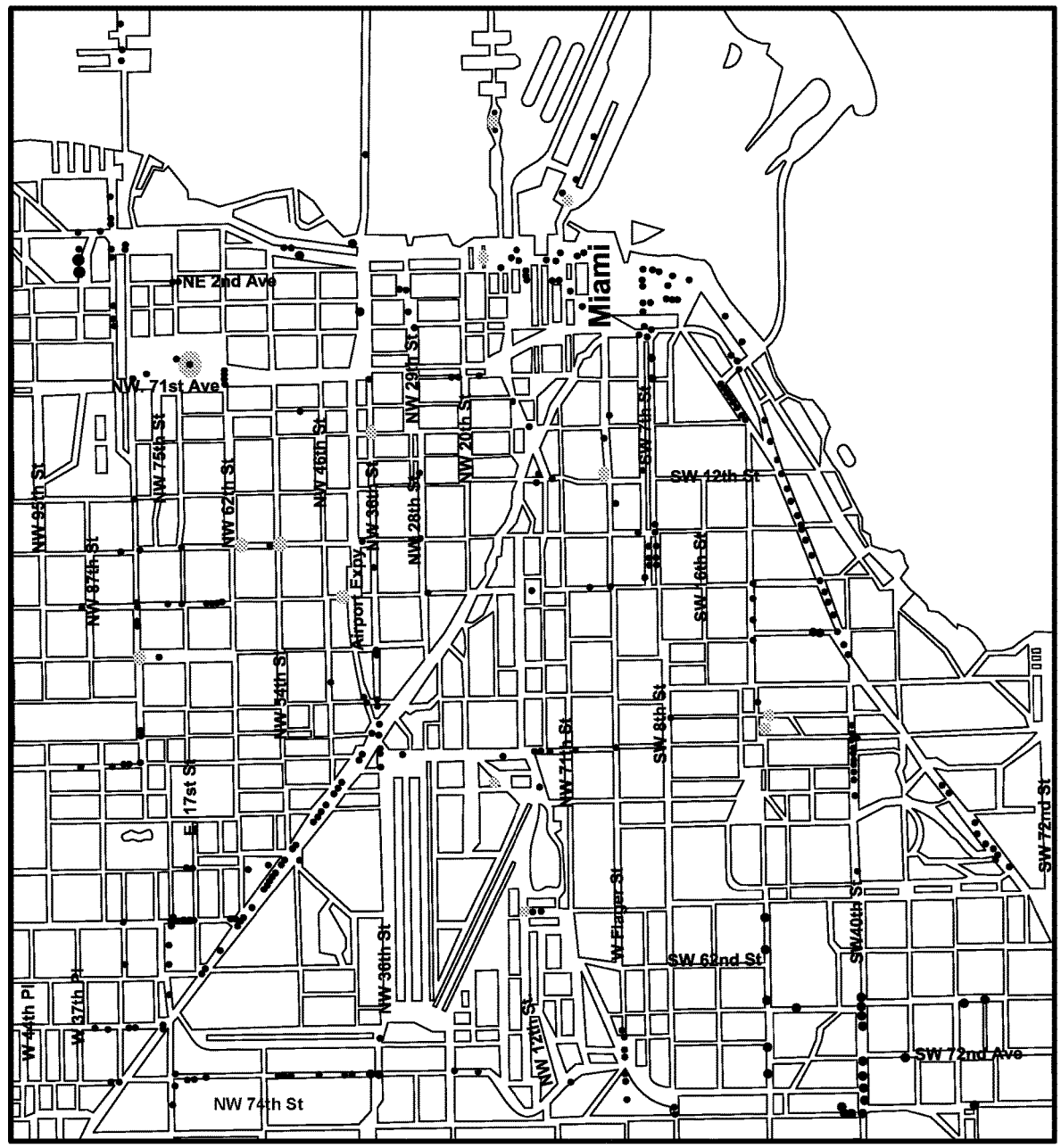

5. Aggregating the geographic positions of phone distraction episodes across multiple drivers 58. This display can be useful to help understand which intersections or road segments may be dangerous in a city. Such a tool is helpful for civic planners. FIG. 2 is an example of a geographic distribution of phone distraction episodes in Miami shown by markers 60, with the color (or another visible attribute) of the marker indicating the number of phone distraction episodes at each location.

6. Phone distraction profile. Various contexts of the phone distraction episodes, including the ones described in Item 2, are aggregated and summarized over an extended period of time (e.g., one year, or over the entire duration for which the user has been on the program). The summary can be represented by graphical representations (plots and maps) as well as text summaries. A few possibilities in the profile summary can include (but are not limited to):

a. Vehicle speed distribution while distracted, a histogram (or equivalently a probability density plot) of vehicle speeds when the user was distracted by phone.
   b. Phone orientation distribution during phone distraction episodes, a pie chart (or equivalent) showing a relative proportion of phone orientations and usage while the user was distracted, for example, 20% mounted, 35% holding in front, 30% holding at ear, 15% others.
   c. Phone activity state distribution, a pie chart (or equivalent) showing a relative proportion of various phone activities, for example 40% calling, 30% texting, 15% checking navigation software, 15% unknown.

We have described technology in which the processing to determine phone distraction episodes (and thus the display of information about those events to the user or an insurance company) is done after the trip. Deferring at least the display of such information reduces the chances of adding to driver distraction. However, in some implementations it is possible to determine the phone distraction episodes in real time (that is, while the trip is in progress), and to indicate to the user the occurrence of phone distraction episodes on the phone in real time, through a visual notification (such as a pop-up message), a sound, a vibration, or a combination of two or more of those indicators.

Although in some examples described above, one or more of the processes are executed on servers remote from the mobile device or on mobile devices, the processes can be implemented on either the mobile devices, the servers, or combinations of them.

Other implementations are also within the scope of the following claims.

The invention claimed is:

1. A method comprising
   receiving signals from one or more detectors housed in a mobile device while the mobile device is on a trip in a vehicle,
   determining a possible distraction episode comprising a distraction of a user of the mobile device based on the received signals,
   after the trip, presenting information about the possible distraction episode to a user who was a participant on the trip in the vehicle,
   receiving from the user who was a participant on the trip in the vehicle information expressly input by the user indicative of a circumstance of the trip, the information being received in response to the presenting of the information about the possible distraction episode to the user after the trip, the circumstance of the trip comprising the user of the mobile device during the possible distraction episode being a passenger of the vehicle during the trip, and
   determining whether the possible distraction episode was a relevant distraction episode based on the circumstance of the trip.

2. The method of claim 1 in which the determining of a possible distraction episode comprises varying the rate at which possible distraction episodes are determined based on a parameter, and adjusting the parameter based on information received from users about whether possible distraction episodes were relevant distraction episodes.

3. The method of claim 1 comprising determining two or more such possible distraction episodes based on the received signals, and aggregating the possible distraction episodes for a given user based on at least one of the following factors: types of possible distraction episodes, speeds associated with possible distraction episodes, types of roads, frequencies of routes traveled, or length of possible distraction episodes.

4. The method of claim 3 comprising reporting information about the aggregated possible distraction episodes to the user.

5. A method comprising presenting to a user of a mobile device through a user interface of the mobile device information about a distraction associated with use of the mobile device while the user was driving a vehicle,
   the information being presented on a map showing a trajectory of a trip in which the distraction occurred, and
   receiving feedback expressly input by the user about accuracy of the information presented on the map.

6. The method of claim 5 comprising
   receiving signals from one or more detectors housed in the mobile device while the user was driving the vehicle on the trip, the received signals being indicative of a possible distraction episode and of a context of the possible distraction episode,
   determining the distraction from the possible distraction episode, and
   scoring the distraction, the scoring comprising accounting for the context, the context including at least one of: speed, time of day, day of week, season, road type, weather conditions, direction of motion, movement or orientation of the mobile device, or tapping on a display screen of the mobile device.

7. The method of claim 6 comprising aggregating location information for distractions for two or more trips.

8. The method of claim 6 comprising aggregating contexts of distractions.

9. The method of claim 8 comprising reporting aggregated contexts with respect to at least one of: speed distribution during distractions, orientations of mobile devices during distractions, and activity state distributions of mobile devices during distractions.

10. The method of claim 5 comprising
    receiving from the user information expressly input by the user indicative of whether the distraction is correct, and, if incorrect, receiving information expressly input by the user indicative of why the distraction is incorrect.

11. The method of claim 6 in which the context comprises at least one of: the mobile device was mounted on the vehicle; the user was holding the mobile device and the display was facing the user; and the mobile device was being held by the user near the user's ear.

12. The method of claim 6 in which the state of operation of the mobile device inherently specifies the context.

13. The method of claim 5 comprising marking the trajectory to indicate distractions.

14. The method of claim 5 comprising displaying the context of the distraction including at least one of the duration of the distraction, the vehicle speed, the road type, activity state of the mobile device, and the context of the driving.

15. A method comprising
receiving from a mobile device a time sequence of information about angular velocity of the mobile device,
detecting peaks of angular velocity along one or more axes relative to the mobile device, the peaks comprising at least a first peak and a second peak, the first peak and the second peak occurring in different directions relative to an axis of the mobile device, and
determining that tapping is occurring on a screen of the mobile device based on the peaks.

16. The method of claim 15 in which the peaks comprise related peaks that occur along two orthogonal axes.

17. The method of claim 15 in which the determining comprises analyzing a frequency of the tapping.

18. The method of claim 15 in which the determining comprises comparing the detected peaks with comparison peaks known to be associated with tapping.

19. The method of claim 15 comprising detecting states of operation of the mobile device and in which the determining is based on the states of operation.

20. The method of claim 15 comprising determining that tapping on the screen of the mobile device has ended.

21. The method of claim 15 comprising assessing a significance of a possible distraction episode based on the determined tapping.

22. The method of claim 15 comprising determining that the screen is in an active state when the tapping is occurring.

* * * * *